United States Patent [19]

Evans

[11] Patent Number: 5,066,501

[45] Date of Patent: Nov. 19, 1991

[54] FLUIDIZATION OF SOAPSTOCK

[75] Inventor: Jeffrey C. Evans, Maple Grove, Minn.

[73] Assignee: Cargill, Incorporated, Minneapolis, Minn.

[21] Appl. No.: 597,106

[22] Filed: Oct. 12, 1990

Related U.S. Application Data

[63] Continuation of Ser. No. 264,633, Oct. 31, 1988, abandoned.

[51] Int. Cl.$^5$ .......................... C11B 3/04; C11C 1/00; A23K 1/175
[52] U.S. Cl. ....................................... 426/74; 260/413; 260/416; 260/424; 260/425; 426/626; 426/807
[58] Field of Search .................... 426/74, 626, 807; 260/413, 416, 424, 425

[56] References Cited

U.S. PATENT DOCUMENTS

| | | | |
|---|---|---|---|
| 3,899,440 | 9/1975 | Hoffmann | 252/371 |
| 3,916,031 | 10/1975 | Beal | 426/540 |
| 4,100,181 | 7/1978 | Phillips et al. | 260/416 |
| 4,118,407 | 10/1978 | Red et al. | 260/412.5 |
| 4,280,962 | 7/1981 | Watanabe et al. | 260/424 |
| 4,361,517 | 11/1982 | Duff et al. | 260/412.5 |
| 4,671,902 | 6/1987 | Brister | 260/412.5 |
| 4,836,843 | 6/1989 | Daniels | 71/25 |

FOREIGN PATENT DOCUMENTS 895395  1/1982  U.S.S.R. .

OTHER PUBLICATIONS

Kirk & Othmer, Encyclopedia of Chemical Technology, vol. 6, p. 160 (1951).
Bailey's Industrial Oil & Fat Products, 3rd Ed., pp. 762–765 (1964).

Primary Examiner—Donald E. Czaja
Assistant Examiner—Evan Federman
Attorney, Agent, or Firm—Fitch, Even, Tabin & Flannery

[57] ABSTRACT

The present invention is directed to a method for treatment of soapstock obtained by alkali refining of fats to provide a fluid, uniform, pumpable animal feed product. In the method, a raw soapstock is provided. Propionic acid is added to the raw soapstock and the pH is adjusted to provide an acidified soapstock. With soapstocks having low gum levels, a fluid, uniform, pumpable product is provided without further treatment. At higher gum levels, the acidified soapstock is heated to a predetermined temperature to provide the fluid, uniform, pumpable product.

9 Claims, No Drawings

FLUIDIZATION OF SOAPSTOCK

This application is a continuation of application Ser. No. 264,633, filed Oct. 31, 1988, now abandoned.

FIELD OF THE INVENTION

The present invention relates to the fluidization of soapstocks which contain a substantial level of moisture and gums, such as lecithin. More particularly, the present invention is directed to the treatment of soapstock with propionic acid to fluidize the soapstock and to provide a fluid, pumpable animal feed product.

BACKGROUND OF THE INVENTION

The residue from alkali refining of fats is generally referred to as "raw soapstock". It is raw soapstock which is the product which is treated by the method of the present invention to provide a fluid, pumpable animal feed product which is also resistant to microbiological and chemical degradation. Raw soapstock is a thick, viscous material which is difficult to pump and which is subject to rapid deterioration by microbiological and chemical degradation. The present invention is directed to a method for making soapstocks more fluid and easily pumpable.

Animal fats and oils consist of triglycerides which are esters of glycerol and fatty acids. Because the fatty acid radical constitutes the greater part of the glyceride molecule, and also the reactive portion, the chemical and physical properties of a fat or oil are determined largely by the properties of the component fatty acids. In general, fats become progressively higher melting and more easily solidified as the average molecular weight of the fatty acids increases, and as their average unsaturation decreases. There is no rigid distinction between "oils" which are liquid at ambient temperature and "fats", which are solid or semi-solid at ambient temperature. For simplicity, the term "fat" is used herein in referring to either the liquid or solid forms of edible triglycerides.

The crude fat, as obtained from a pressing or solvent extraction operation contains impurities which are removed by refining the crude fat. One of the more prevalent impurities is in the form of free fatty acids. Free fatty acids are most often removed from the crude fat by alkali refining. Alkali refining is generally carried out by treating the fat with a strong solution of caustic soda. The process involves emulsifying the fat with a considerable excess of an aqueous solution to saponify the fatty acids and form a soap, heating to break the emulsion, and separation of the refined fat from the precipitated soap and miscellaneous associated impurities. A small proportion of the triglycerides are also saponified in addition to the reaction of the caustic soda with the free fatty acids. The precipitated material removed from the refined oil is known in the trade as "soapstock".

Soapstock generally contains from about 30% to about 50% of fatty acids, from about 25% to about 60% of moisture and from about 3% to about 12% of nonfatty components, including gums, such as lecithin. Soapstock has been used in soap making and the manufacture of commercial fatty acids. More recently, however, because of the high energy value of soapstock, soapstock has been used as a feed supplement in finished feed formulations for animals.

It is known to reduce the amount of moisture in soapstock to prevent microbiological and chemical degradation. One of the most commonly used methods for reducing the moisture of soapstock is by acidulation. Acidulation is accomplished by boiling the soapstock in an open tank or kettle with sulfuric acid, using open steam for heating and agitation. The acid must be used in considerable excess. After about 2-4 hours of vigorous boiling, the charge is allowed to settle for a short time and the fatty layer is tested for total fatty acid content. If the fatty acid content is satisfactory, settling is continued overnight or for a minimum of about 4-6 hours. If the total fatty acid is low, additional acid is added and boiling and settling are repeated. After the addition of acid is completed and the charge is well settled, the lower water and mineral acid layer, plus a certain amount of sludge is discharged. The fatty material is then washed by adding ¼ to ½ its own weight of water, followed by boiling for a short time, settling overnight and discharging the wash water. One wash is usually sufficient to reduce the mineral acid content sufficiently to obtain a substantially neutral pH. Thus, the low moisture fatty acid product recovered from the acidulation process is not itself at an acid pH.

Accordingly, it is a principle object of the present invention to provide a method for treatment of a fat containing a substantial level of free fatty acids, gums and moisture to provide a fluid pumpable animal feed product.

It is another object of the present invention to provide a method for treatment of raw soapstock to provide a fluid, pumpable animal feed product.

It is a further object of the present invention to provide an animal feed product which contains a high level of energy and which can contribute to the preservation of a finished feed formulation.

These and other objects of the invention will become more apparent from the following description and the depended claims.

SUMMARY

The present invention is directed to a method for treatment of a fat containing a substantial level of free fatty acid and moisture, such as raw soapstock, to provide a fluid, uniform, pumpable animal feed product which can be used as an animal feed supplement. In the method, a raw soapstock is provided as obtained from alkali refining of a fat. Propionic acid is added to the raw soapstock to solubilize the gums and to provide an acidified soapstock. With soapstocks having relatively low gum levels, a fluid, uniform pumpable feed stock is provided without further treatment. At higher gum levels, the acidified soapstock is heated to a predetermined temperature to provide the fluid, uniform pumpable animal feed product of the invention.

DETAILED DESCRIPTION OF THE INVENTION

The method of the present invention is particularly suitable for the treatment of commercially available soapstock which is a byproduct of alkali refining of a fat. Soapstock generally contains from about 30% to about 40% of total fatty acids; of which from about 10% to about 30% are in the form of saponified free fatty acids. Commercial grades of soapstock contain from about 5% to about 100% by weight of gums, including lecithin, based on the weight of the total fatty acids present in the soapstock. Such wide variation in the level of gums is due to the fact that some, but not all, commercially available soapstocks have been subjected to a full or partial degumming step.

Soapstock usually contains from about 25% to about 60% of moisture and from about 3% to about 12% of total non-fatty components, including gums, such as lecithin. The most common source of soapstock is from alkali refining of edible vegetable oils, such as soybean oil, cotton seed oil, peanut oil, coconut oil, corn oil, sunflower oil, rapeseed oil, safflower oil and palm oil.

In accordance with the invention, propionic acid is added to the soapstock at a level sufficient to solubilize the gums and provide a fluid, pumpable animal feed product. No other organic acid has been found to be suitable to effect solubilization of the gums and to fluidize the soapstock. The level of propionic acid required is dependent upon the level of gums present in the soapstock. In general, the level of propionic acid required can be as low as 0.5% for the lowest level of gum found in commercial grades of soapstock and can be as high as forty percent for the highest level of gums. All percentages used herein are by weight of the soapstock unless otherwise indicated.

A further requirement of the method of the invention is that the pH of the soapstock must be reduced to below about 6 to effect fluidization of the soapstock. At levels of addition of propionic acid above about 5% the pH of the soapstock is reduced to below about 6 and no further treatment is required, with the exception of the requirement for heating of some soapstock as discussed hereinbelow. In general, because of the high cost of propionic acid, it is desirable to use the least amount of propionic acid that is required to solubilize the gums of the soapstock. For most grades of soapstock, the minimum required level of addition of propionic acid to soapstock will be less than 5% and the pH of the soapstock will be above 6 after such addition. At levels of addition of propionic acid below about 5%, however, the pH of the soapstock can be reduced to below 6 by the addition of an inorganic acid. Suitable inorganic acids are phosphoric acid, hydrochloric acid and sulfuric acid. Preferably, the pH of the soapstock is reduced to a level within the range of from about 3 to about 6, either solely thru the addition of propionic acid or by the use of a combination of propionic acid and an inorganic acid.

As indicated, the inorganic acid, when used, is added at a level sufficient to reduce the pH of the soapstock to a level of from about 3 to about 6. A sufficient quantity of inorganic acid to attain the desired pH level is from about 0% to about 10% of the inorganic acid, expressed as equivalent pure acid. When the level of propionic acid is from about 0.5% to about 5%, the level of inorganic acid is preferably from about 1% to about 8%, expressed as equivalent pure acid.

After the pH of the soapstock has been reduced to the desired level to provide an acidified soapstock, the acidified soapstock may require heating to effect solubilization of the gums and to provide a fluid, uniform pumpable consistency to the acidified soapstock. In general, the gums contained in soapstock are phospholipids, such as lecithin. The gum content of soapstock is related to the percentage by weight of the phosphorous present in the soapstock and this level of phosphorous ranges from about 0.1% to about 2%. At phosphorous levels of less than about 1%, no heating is required after addition of the propionic acid or combination of propionic acid and an inorganic acid. At phosphorous levels above about 1%, heating to an elevated temperature above about 100.F is required. As the phosphorous level increases above 1%, heating to higher elevated temperatures is required. At a phosphorous level of about 1.8%, heating to a elevated temperature of about 150° F. is satisfactory to attain a fluid, uniform consistency. No substantial holding time is required, although acidified soapstock can be held at the elevated temperature for lengthy periods of time without harm but no further effect is obtained from such lengthened period of holding. In a preferred embodiment of the invention, the acidified soapstock is heated to a temperature of from about 100° F. to about 300° F. to assure solubilization of the gums.

After the heating step, the acidified soapstock is cooled to ambient temperature to provide the fluid, uniform pumpable animal feed product of the invention which is resistant to microbiological and chemical degradation.

The following examples further illustrate various features of the present invention but are intended to limit the scope of the invention which is set forth in the appended claims.

EXAMPLE I

A low gum containing raw soybean soapstock having 42% total fatty acids and 55% moisture was treated by the method of the invention. An acidified soybean soapstock was prepared which contained 1% propionic acid and 7% of 75% phosphoric acid. The pH was 5.6. A sample of the acidified soybean soapstock and a sample of the raw soapstock were each placed in an environmental chamber and held at 85° F. and 90% relative humidity. After a period of seven days, the raw soapstock contained 7,000 ppm $CO_2$ while the acidified soapstock had less than 3,000 ppm of $CO_2$. After fourteen (14) days the acidified soapstock still had less than 3,000 ppm $CO_2$, whereas the raw soapstock had 20,000 ppm of $CO_2$.

EXAMPLE II

The raw soybean soapstock of Example 1 was used to prepare three samples of acidified soapstock, in accordance with the following Table:

TABLE I

| Ingredient | Sample 1 | Sample 2 | Sample 3 |
|---|---|---|---|
| Soybean Soapstock | 99.0 | 93.0 | 92.0 |
| Propionic Acid | 1.0 | 0 | 1.0 |
| Phosphoric Acid 75% | 0 | 7.0 | 7.0 |
|  | 100.0 | 100.0 | 100.0 |

Each of the three samples was heated to a temperature to 170° F. The samples were then cooled to ambient temperature and the pH of each sample was measured. The pH of sample 1 was 9.5, that of sample 2 was 6.0 and that of sample 3 was 5.6. The appearance of sample 1 immediately after cooling was not substantially different than that of the raw soybean soapstock, i.e., the appearance was thick and viscous. The viscosity of sample 2 was fluid and water-like immediately after cooling. After a day of holding the viscosity of sample 2 was fluid and stringy. The viscosity of sample 3 immediately after cooling was fluid and water-like and remained fluid and water-like after a day of holding.

EXAMPLE III

In accordance with the present example, the effect of propionic acid, sulfuric acid, and temperature on soapstock fluidization was examined. Two soapstock sources, each containing 55% moisture but different levels of phosphorous, were treated with heat between room temperature and 212° F. after 1% propionic acid and/or 4% sulfuric acid was added and the samples were mixed with a mechanical blade mixer.

|  | #1 | #2 | #3 | #4 | #5 |
|---|---|---|---|---|---|
| Formulas: | | | | | |
| Conway Oils Soapstock (phosphorus content 1.0%) | 100.0 | 99.0 | 96.0 | 95.0 | — |
| Gainesville DSP Soapstock (phosphorous content 1.8%) | — | — | — | — | 95.0 |
| Propionic Acid | — | 1.0 | — | 1.0 | 1.0 |
| Sulfuric Acid | — | — | 4.0 | 4.0 | 4.0 |
|  | 100.0 | 100.0 | 100.0 | 100.0 | 100.0 |
| pH | 7.6 | 7.3 | 4.9 | 5.2 | 3.4 |
| Data: | | | | | |
| Temperature (°F.) | | | | | |
| Room Temperature | Thick Uniform | Thick Grainy |  | Fluid Uniform | Thick Uniform |
| 125 | Thick Uniform | Thick Grainy |  | Fluid Uniform | Slightly Thick Uniform |
| 175 | Thick Uniform | Thick Chunky | Fluid Stringy | Fluid Uniform | Fluid Uniform |
| 212 | Thick Uniform | Thick Chunky |  | Fluid Uniform | Fluid Uniform |

Terms:
Thick - Does not pour
Slightly Thick - Pours slowly
Fluid - Pours similar to water
Grainy - Very fine particles throughout sample
Chunky - Large particles throughout sample
Stringy - Particles present with gum-like consistency
Uniform - No obvious particles or gum-like consistency present The process of the present invention is used to fluidize soapstock and to prevent microbiological and chemical degradation of the soapstock during storage. The fluidized soapstock can be used as a high energy feed supplement either as is or after blending with molasses or other liquid animal feed products for the livestock feed industry.

What is claimed is:

1. A method for treatment of soapstock to provide a fluid, stabilized product useful for animal feed formulation comprising
   (a) providing a raw soapstock obtained from alkali refining of a fat, said soapstock comprising from about 30% to about 50% of total fatty acids, from about 25% to about 60% moisture and from about 3% to about 12% of non-fatty components; and
   (b) adding propionic acid to said soapstock to provide an acidified soapstock with a pH of about 3 to about 6, said propionic acid being added at a level sufficient to solubilize the gums present in said soapstock.

2. A method in accordance with claim 1 wherein said propionic acid is present in said acidified soapstock at a level of from about 0.5% to about 40%.

3. A method in accordance with claim 1 wherein said propionic acid is present at a level insufficient to reduce the pH of said soapstock to below about 6 and an inorganic acid is added at a level sufficient to reduce the pH of said soapstock to below about 6.

4. A method in accordance with claim 3 wherein said inorganic acid is present in said acidified soapstock at a level of from about 1 to about 10 percent.

5. A method in accordance with claim 3 wherein said inorganic acid is selected from the group consisting of phosphoric acid, hydrochloric acid and sulfuric acid and mixtures thereof.

6. A method in accordance with claim 1 or 3 wherein said acidified soapstock is heated to a predetermined temperature of from about 100° F. to about 300° F.

7. A method in accordance with claim 5 wherein said inorganic acid is phosphoric acid.

8. A method in accordance with claim 3 wherein said propionic acid is present in said acidified soapstock at a level of from about 0.5 to about 5 percent and said inorganic acid is present in said acidified soapstock at a level of from about 1% to about 8%, expressed as equivalent pure acid.

9. A method in accordance with claim 1 wherein said soapstock is the residue from alkali refining of an edible fat selected from the group consisting of soybean oil, cottonseed oil, coconut oil, olive oil, corn oil, peanut oil, rapeseed oil, palm oil, and safflower oil.

* * * * *